United States Patent

Pesco, Sr.

[11] Patent Number: 5,163,696
[45] Date of Patent: Nov. 17, 1992

[54] SCOOTER APPARATUS

[76] Inventor: Roger J. Pesco, Sr., P.O. Box 161, Three Springs, Pa. 17264

[21] Appl. No.: 771,114
[22] Filed: Oct. 4, 1991
[51] Int. Cl.⁵ .............................. B62M 1/00
[52] U.S. Cl. .................................... 280/221
[58] Field of Search ................. 280/220-224

[56] References Cited

U.S. PATENT DOCUMENTS

| 1,440,372 | 4/1918 | Brown et al. | 280/221 |
| 1,977,035 | 10/1934 | Benjamin | 280/221 |

FOREIGN PATENT DOCUMENTS

| 634570 | 2/1928 | France | 280/221 |
| 297012 | 6/1932 | Italy | 280/221 |

Primary Examiner—Charles A. Marmor
Assistant Examiner—Florian Zeender
Attorney, Agent, or Firm—Leon Gilden

[57] ABSTRACT

An apparatus wherein a scooter includes a frame plate mounting a guide post and forward wheel to the forward end of the frame post, wherein a frame member mounts a fly wheel spaced forward of a rear driven wheel, wherein the fly wheel is rotated by use of an "L" shaped crank pivotally mounted to a rear end portion of a drive platform that is pivotally mounted at its forward end to a forward portion of the frame. Spring members positioned adjacent the fly wheel effect extension of the platform upon an individual depressing the platform effecting rotation of the fly wheel.

4 Claims, 4 Drawing Sheets

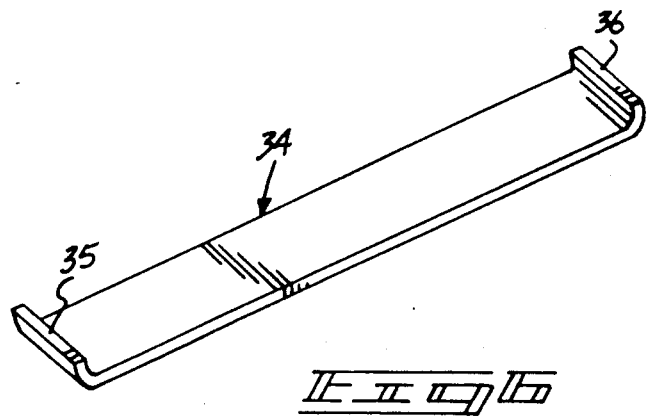
FIG 6
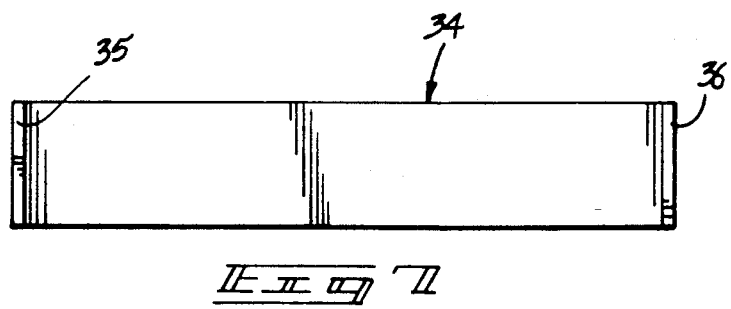
FIG 7
FIG 8
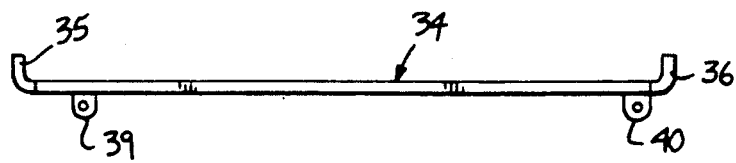

SCOOTER APPARATUS

BACKGROUND OF THE INVENTION

1. Field of the Invention

The field of the invention relates to scooter apparatus, and more particularly pertains to a new and improved scooter apparatus wherein the same utilizes a crank driven fly wheel to effect rotation of a rear driven wheel.

2. Description of the Prior Art

Manually propelled scooter apparatus is available in the prior art to permit individuals to effect mobility utilizing leg power and the like for actuation of the scooter structure. Such a structure is exemplified in U.S. Pat. No. 3,362,723 to Bretholz wherein a scooter includes a lever plate, wherein the lever plate is pivoted at its forward end and a rear end of the lever plate includes a rack operative relative to a toothed wheel to effect rotation of a rear driven wheel.

U.S. Pat. No. 4,379,566 to Titcomb sets forth an operator controlled vehicle utilizing pedals rotated about the frame to effect rotation of a rear wheel by flexible driven cables.

U.S. Pat. No. 4,880,249 to Gray, et al. sets forth a pedal operated vehicle utilizing a cam and cam follower driver assembly to effect actuation of the rear wheel of the scooter.

As such, it may be appreciated that there continues to be a need for a new and improved scooter apparatus as set forth by the instant invention which addresses both the problems of ease of use as well as effectiveness in construction in providing a manually propelled scooter construction capable of enhanced usage and ease of construction in its assembly and operation.

SUMMARY OF THE INVENTION

In view of the foregoing disadvantages inherent in the known types of scooter apparatus now present in the prior art, the present invention provides a scooter apparatus wherein the same utilizes a crank driven fly wheel positioned forwardly of a rear driven wheel to effect rotation of the rear driven wheel upon rotation of the fly wheel by a driven platform pivotally mounted to the frame work of the scooter. As such, the general purpose of the present invention, which will be described subsequently in greater detail, is to provide a new and improved scooter apparatus which has all the advantages of the prior art scooter apparatus and none of the disadvantages.

To attain this, the present invention provides an apparatus wherein a scooter includes a frame plate mounting a guide post and forward wheel to the forward end of the frame post, wherein a frame member mounts a fly wheel spaced forwardly of a rear driven wheel, wherein the fly wheel is rotated by use of an "L" shaped crank pivotally mounted to a rear end portion of a drive platform that is pivotally mounted at its forward end to a forward portion of the frame. Spring members positioned adjacent the fly wheel effect extension of the platform upon an individual depressing the platform effecting rotation of the fly wheel.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the disigning of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved scooter apparatus which has all the advantages of the prior art scooter apparatus and none of the disadvantages.

It is another object of the present invention to provide a new and improved scooter apparatus which may be easily and efficiently manufactured and marketed.

It is a further object of the present invention to provide a new and improved scooter apparatus which is of a durable and reliable construction.

An even further object of the present invention is to provide a new and improved scooter apparatus which is susceptible of a low cost of manufacture with regard to both materials and labor, and which accordingly is then susceptible of low prices of sale to the consuming public, thereby making such scooter apparatus economically available to the buying public.

Still yet another object of the present invention is to provide a new and improved scooter apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 6 is an isometric illustration of the drive platform utilized by the instant invention.

FIG. 7 is an orthographic top view of the drive platform.

FIG. 8 is an orthographic side view of the drive platform.

DESCRIPTION OF THE PREFERRED EMBODIMENT

Figure 1:
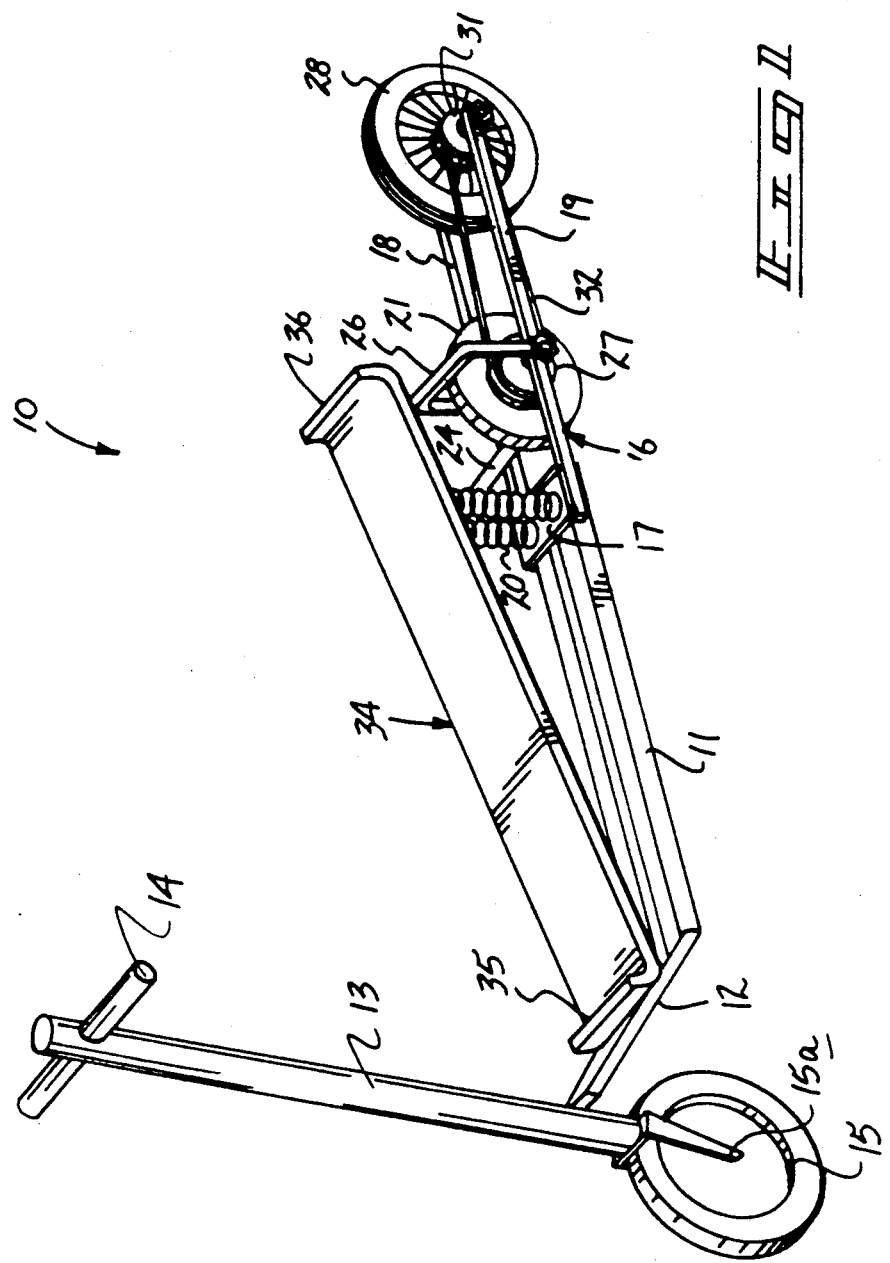
FIG. 1 is an isometric illustration of the instant invention.
Figure 2:
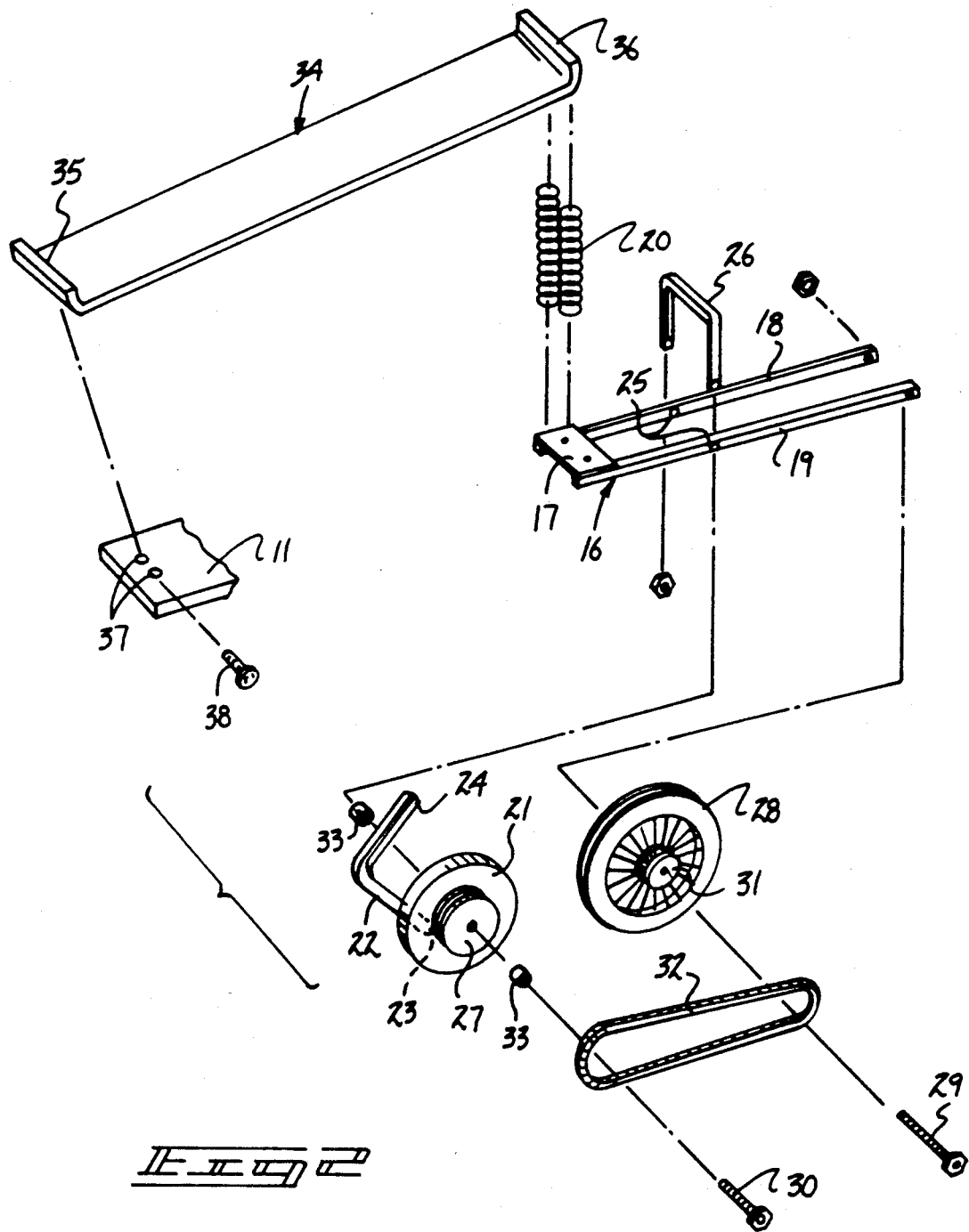
FIG. 2 is an isometric exploded view of the drive mechanism of the invention.
Figure 3:
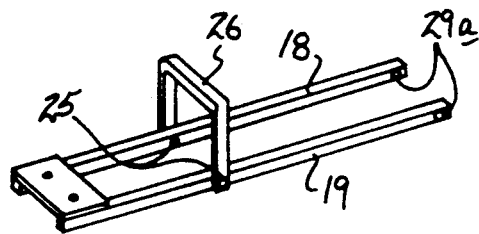
FIG. 3 is an isometric illustration of the rear frame member utilized by the invention.
Figure 4:
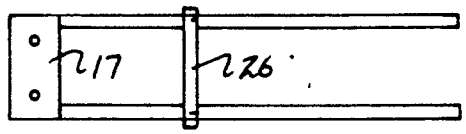
FIG. 4 is an orthographic top view of the frame member, as illustrated in FIG. 3.
Figure 5:
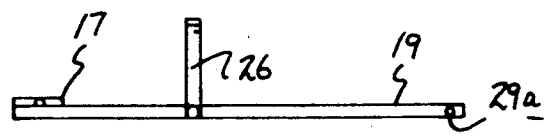
FIG. 5 is an orthographic side view of the frame member, as illustrated in FIGS. 3 and 4.

With reference now to the drawings, and in particular to FIGS. 1 to 8 thereof, a new and improved scooter apparatus embodying the principles and concepts of the present invention and generally designated by the reference numeral 10 will be described.

More specifically, the scooter apparatus 10 of the instant invention essentially comprises a forward frame plate 11 that includes a neck plate 12 mounted fixedly to the forward end of the forward frame plate extending upwardly therefrom secured to a guide post 13 arranged for rotation relative to the neck plate 12, wherein the guide post 13 includes a handle bar 14 fixedly mounted at an upper end thereof, and a forward wheel 15 rotatably mounted below a bottom end of the guide post 13, wherein the forward wheel includes a forward wheel axle 15a rotatably mounting the forward wheel through a plurality of support flanges. A rear frame member 16 extends in the coplanar relationship rearwardly of the forward frame plate 11, and includes a rear frame front plate 17 that is mounted to a top surface of the forward frame plate 11 adjacent the rear end, with the front plate 17 orthogonally mounting a respective right and left support bar 18 and 19 that are arranged in a parallel relationship relative to one another extending coplanar relative to the forward frame plate 11. The rear frame front plate 17 mounts at least one or a plurality of spring members 20 upwardly therefrom to provide for spring back characteristic to a drive platform 34. The drive platform 34 includes a front flange 35 and a rear flange 36 extending upwardly from a central planar platform to permit an individual to maintain positioning within the drive platform 34. The drive platform 34 includes a forward pivot flange 39 pivotally mounted to forward frame plate pivot hinge ears 37 by use of a forward pivot axle 38 (see FIGS. 2 and 8 for example). The drive platform 34 includes a rear pivot flange 40 adjacent the rear flange 36 pivotally mounted to an upper crank arm pivot 24 of an "L" shaped crank arm 22. The "L" shaped crank arm 22 includes a lower crank arm pivot 23 pivotally mounted to a right face of a fly wheel 21 that is rotatably mounted between the right and left support bars 18 and 19 through a plurality of coaxially aligned right and left support bar apertures 25. Manual deflection of the drive platform 34 effects rotation of the fly wheel 21, whereupon release of the drive platform 34 effects upward springing of the drive platform by the spring members 20 and permits the crank arm 22 to rotate upwardly to permit a successful drive cycle in use. A "U" shaped guard 26 is optionally mounted to overlie the fly wheel 21 and is mounted to the same fly wheel axle 30 that in turn is directed through the right and left support bar apertures 25. A grooved pulley 27 is fixedly and coaxially mounted to a left face of the fly wheel 21 and includes an endless drive belt 32 positioned within the groove of the grooved pulley 27. A rear wheel 28 utilizing a rear wheel axle 29 is rotatably mounted to rear terminal ends of the right and left support bars 18 and 19 through rear wheel axle right and left support bar apertures 29a that are orthogonally directed in a coaxially aligned relationship relative to one another through rear terminal ends of the right and left support bars 18 and 19. A rear wheel driven pulley 31 is fixedly mounted in a coaxially aligned relationship to a left side of the rear wheel 28 in alignment with the grooved pulley 27 to receive the endless drive belt 32, whereupon rotation of the fly wheel 21 effects rotation of the rear wheel driven pulley and associated rear wheel 28. As required, spacer members 33 are utilized with the fly wheel axle 30 and may be utilized with the rear wheel axle 29 to align the grooved pulley 27 and the rear wheel driven pulley 31 together.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A scooter apparatus, comprising, a forward frame plate, the forward frame plate fixedly mounted to a neck plate extending upwardly of the forward frame plate defining an obtuse angle therebetween, wherein the neck plate rotatably mounts a guide post, the guide post including a handle bar mounted at an upper end of the guide post and a forward wheel rotatably mounted relative to a lower end of the guide post, and the forward frame plate fixedly mounting a rear frame member in a coplanar relationship relative to the forward frame plate, the rear frame member including a fly wheel means mounted within the rear frame member cooperatively coupled with a rear wheel rotatably mounted within the rear frame member rearwardly of the fly wheel means for effecting rotation of the rear wheel upon rotation of the fly wheel means, and a drive platform pivotally mounted to the forward frame plate, with the drive platform including crank arm means pivotally mounted adjacent a rear end of the drive platform for effecting rotation of the fly wheel means upon pivotment of the drive platform relative to the forward frame plate, and wherein the drive platform includes a forward pivot mount pivotally mounted to a plurality of spaced hinge ears, wherein the spaced hinge ears are fixedly mounted adjacent a forward end of the forward frame plate to pivotally mount the drive platform adjacent a forward end of the forward frame plate, and the drive platform including a rear pivot flange, the rear pivot flange pivotally mounted to an upper terminal end of the crank arm means, the crank arm means configured of an "L" shaped configuration, wherein a lower end of the crank arm includes a lower pivot pivotally mounted to a right face of the fly wheel means, and the fly wheel means includes a grooved pulley fixedly and coaxially mounted to the fly wheel means, the fly wheel means configured of a cylindrical configuration, including a fly wheel axle orthogonally directed through the rear frame member, and a "U" shaped guard orthogonally mounted to the rear frame member spaced above the fly wheel means for preventing interference of the fly wheel means with the drive platform.

2. An apparatus as set forth in claim 1 wherein the rear frame member includes a front plate, the front plate fixedly mounted adjacent a rear end of the forward frame plate, and the front plate including at least one spring member captured between the front plate and the drive platform adjacent the rear pivot flange of the drive platform.

3. An apparatus as set forth in claim 2 wherein the drive platform includes a front flange extending upwardly of a front edge of the drive platform, and a rear flange extending upwardly of a rear end of the drive platform to maintain an individual within the drive platform.

4. An apparatus as set forth in claim 3 wherein the rear frame member includes a right and left support bar extending coplanar relative to the forward frame plate and rearwardly thereof, with the rear wheel rotatably mounted about a rear wheel axle, the rear wheel axle arranged parallel to the fly wheel axle and directed orthogonally through the right and left support bar to rotatably mount the rear wheel, and the rear wheel including a rear wheel driven pulley fixedly and coaxially mounted to a left side face of the rear wheel, with an endless drive belt wound about the grooved pulley and the rear wheel driven pulley to provide for transmission of rotative energy of the fly wheel to the rear wheel.

* * * * *